Sept. 2, 1941.   R. W. BONNER ET AL   2,254,206
MICROPHONIC TRANSMITTER
Filed March 28, 1940
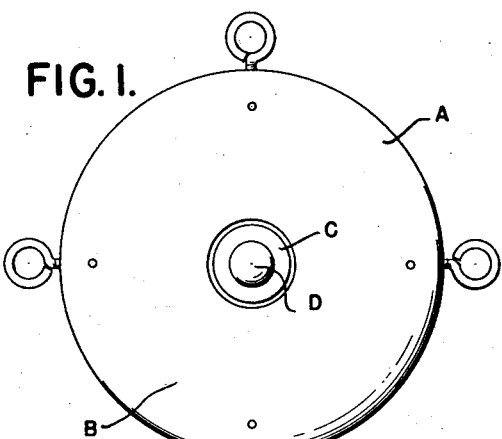
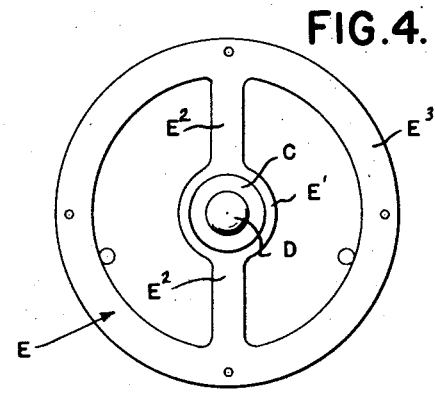
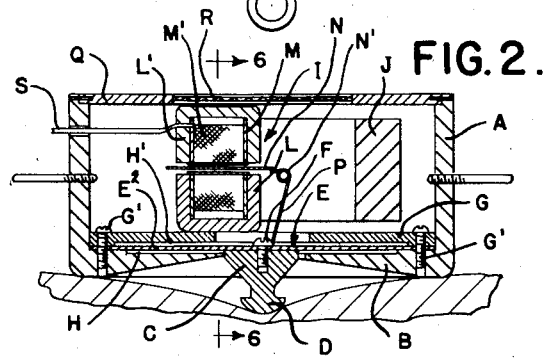
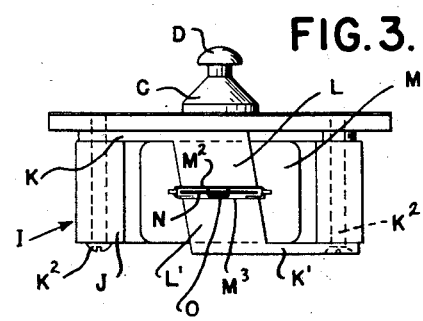
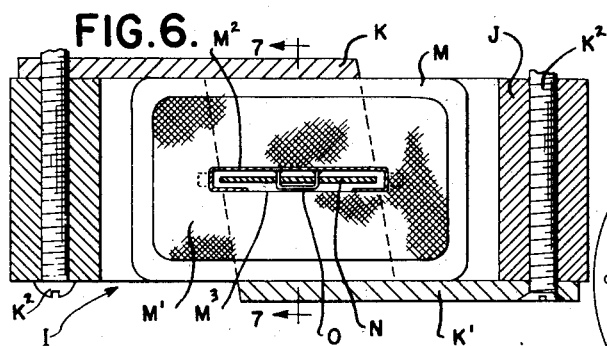
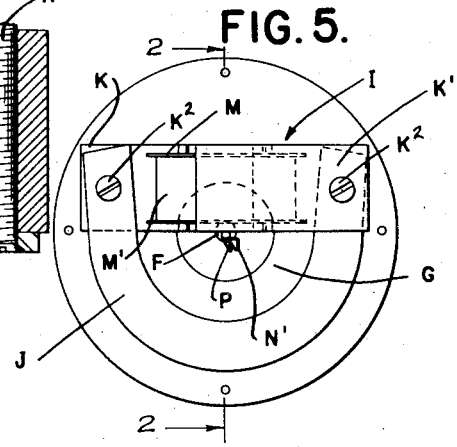
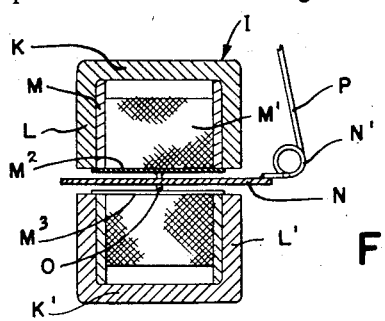
*INVENTOR.*
RAYMOND W. BONNER
HARRY M. KIRSCHBAUM
BY
*ATTORNEYS*

Patented Sept. 2, 1941

2,254,206

UNITED STATES PATENT OFFICE 2,254,206

MICROPHONIC TRANSMITTER

Raymond W. Bonner and Harry M. Kirschbaum, Detroit, Mich.; said Bonner assignor to said Kirschbaum Application March 28, 1940, Serial No. 326,492

9 Claims. (Cl. 181—24)

The invention relates to microphonic transmitters and has for its object the obtaining of a construction particularly adapted for use in amplifying the sound of the human heart. Physicians and surgeons are trained to determine the condition of the heart by the sound of its action, which is detected either directly by the ear or through the use of a stethoscope. However, where the heart action is feeble this sound is very faint and hard to detect while the stethoscope interferes with the freedom of the user for other action. Microphonic amplifiers heretofore constructed may be used for increasing the volume of the sound, but experience has demonstrated that these also amplify disturbing sounds, so as to render true diagnosis difficult.

It is the primary object of our invention to obtain a construction of microphonic transmitter which will translate into electrical oscillations the sound of the heart action undisturbed by other sounds or vibrations. Such electrical oscillations can thus be amplified to produce an increased sound volume exactly corresponding to that which may be faintly detected by a stethoscope or even fainter sounds that are beyond the range of the stethoscope. It is a further object to obtain an instrument which may be thus used for amplifying the sound of the heart action of an unborn infant. With these and other objects in view, our invention consists in the construction as hereinafter set forth.

In the drawing:

Figure 1 is an inverted plan view of our improved microphonic transmitter;

Figure 2 is a vertical central section therethrough in the plane of line 2—2, Figure 5;

Figure 3 is an elevation of the instrument with the outer casing removed;

Figure 4 is a bottom plan view thereof;

Figure 5 is a top plan view thereof;

Figure 6 is an enlarged section substantially on line 6—6 of Figure 2;

Figure 7 is a section on line 7—7 of Figure 6.

A very common defect of sound amplifying instruments is that they not only increase the volume of the particular sound desired, but also of many other disturbing sounds. This is the case with instruments that have heretofore been used for amplifying the sound of heart action, so that such instruments are of little use in determining the patient's condition. With our improved transmitter we are able to exclude disturbing sounds and to amplify only the sound produced by heart action, the construction being as follows.

A is an outer casing having fairly heavy walls to exclude external sound vibrations from the interior of said casing. The casing is preferably of cylindrical form and has its lower end formed with a concave head B centrally apertured for the outward passage of a member C terminating in a rounded knob D. This knob projects beyond the plane of the periphery of the head B, so that when placed against the flesh of the patient it will be depressed therein to come into contact with the more rigid tissues. In so doing, the periphery of the head will come into contact with or in close proximity to the flesh of the patient, thereby forming a substantially closed chamber for the knob and member C.

Within the casing A adjacent to the head B is a diaphragm E. This is preferably of the form shown in Figure 4, having a central portion E' to which the member C is attached by suitable means, such as the screw F. This central portion is connected by integral and preferably diametrically opposed narrow strips $E^2$ with an outer annular portion $E^3$. The latter is clamped to the head B by an inner head member G and screws G', and both of these head members are recessed as indicated at H and H', so that the portions E' and $E^2$ when vibrating, will be free from contact therewith. The diaphragm is preferably formed of a non-magnetic metal, such as bronze. Within the casing and mounted upon the head G is an electro-magnetic transmitter I. This includes a permanent U-shaped magnet J having extension pole pieces K and K' secured thereto by screws $K^2$ and each pole piece terminating in U-shaped portions L and L', which are opposed to each other and in fairly close proximity. Within the space enclosed by the portions L and L' is a spool M on which is wound a helix M' of very fine insulated wire. The spool is fashioned to form a core portion having substantially parallel opposite sides $M^2$ and $M^3$ with a narrow space therebetween. In this space is arranged a flat armature member N, which is centrally pivoted preferably by attachment to a flexible staple O so as to be capable of oscillation about this pivot. P is a link member connected to the diaphragm, preferably to the screw F, and at its opposite end connected to one end of the armature N. Between these ends is a coil or helix N' having sufficient flexibility and resiliency to permit of the angular movement of the armature N about its pivot, while transmitting thereto the vibratory movement of the diaphragm. This link is preferably formed of German silver wire as we have found that this material in the form described, transmits the vibrations of the diaphragm corresponding to the heart sound, while dampening out other vibrations which would produce interfering sounds. The casing A is completed by a cover Q having a center opening with a perforated screen R therein. This permits of equalization of internal and external air pressures. S is a flexible conductor cord through which the conductors connected with the terminals on the coil pass outward to the cooperating apparatus.

The construction as described may be used in connection with any suitable loud speaker and amplifying means through which the feeble undulatory current generated in the coil is amplified to produce a sound of the desired volume. In use the casing is placed over the heart of the patient or in the case of an unborn infant over the abdomen of the mother. The knob D is arranged at the bottom so as to press into the flesh until it comes in contact with the firm underlying tissues. The weight of the device is sufficient to produce the desired impression and this also brings the periphery of the casing in contact with the surrounding flesh forming in effect the sealed chamber in which the knob is located. Also, the softer outer tissues will have a dampening effect preventing the transmission of vibrations which would produce disturbing sounds. Thus, the sound which is amplified exactly corresponds to that feebly produced by the heart action, and enables the attending physician or surgeon to keep close watch as to the condition of the patient.

An important feature of our invention is that the vibratory diaphragm which is mechanically actuated by the sound vibrations is separate and spaced from the armature, which in cooperation with the magnet and coil generates the electrical oscillations. Also, the linkage between the diaphragm and armature is such as to dampen out certain vibrations of small amplitude which may be present in the diaphragm. This not only prevents the transmission of disturbing sounds, but also prevents disturbance caused by feedback from the amplifier. A further feature is that the diaphragm being non-magnetic may be formed of a softer metal than iron or steel, such as bronze, which also produces a dampening effect. The total result is that the amplified sound corresponds to the heart sound free from other noises.

What we claim as our invention is:

1. In an apparatus for amplifying the sound of heart action, a casing for resting on the body of the patient and enclosing a microphonic transmitter including a vibratory diaphragm peripherally attached to said casing, a knob secured to said diaphragm extending out through an aperture in said casing and adapted to be depressed by the weight thereof into the flesh of the patient and into firm connection with the underlying tissues of the patient, and vibration dampening means intermediate said knob and said microphonic transmitter.

2. In an apparatus for amplifying the sound of heart action, a casing enclosing a microphonic transmitter including a vibratory diaphragm, peripherally attached to said casing, said casing having a concave bottom marginally resting on the body of the patient, a knob secured to said diaphragm extending out centrally through an aperture in said bottom and adapted to be depressed by the weight of the casing into the flesh of the patient and into firm connection with the underlying tissues of the patient, and vibration dampening means intermediate said knob and said microphonic transmitter.

3. In an apparatus for amplifying the sound of heart action, a microphonic transmitter comprising a magnet, opposite pole extensions of said magnet each having spaced portions extending into proximity and in parallel relation to the corresponding portions of the opposite pole piece, an oscillatory armature having its opposite ends extending between said spaced poles and centrally pivoted therebetween, an induction coil surrounding but free from said armature, a vibratory diaphragm, a vibration dampening link connecting said diaphragm peripherally attached to said casing with one end of said armature, an enclosing casing, and a knob secured to said diaphragm extending out through an aperture in said casing and adapted to be depressed by the weight thereof into firm connection with the underlying tissues of the patient.

4. In an apparatus for amplifying the sound of heart action, a microphonic transmitter comprising a magnet, opposite pole extensions of said magnet having spaced portions extending into proximity and in parallel relation to the corresponding portions of the opposite pole piece, an oscillatory armature pivoted centrally between said spaced pole portions and having its opposite ends extending therebetween, an induction coil surrounding but free from said armature, a vibratory diaphragm peripherally attached to said casing, a link connecting said diaphragm with one end of said armature, said link being formed of flexible resilient material and having an intermediate coil portion for permitting the angular movement of said armature while transmitting the vibrations of the diaphragm thereto, a surrounding casing, and a knob secured to said diaphragm extending outward through an aperture in said casing and adapted to be depressed by the weight thereof into firm connection with the underlying tissues of the patient.

5. In an apparatus for amplifying the sound of heart action, a microphonic transmitter including a magnet, an oscillatory armature in operative relation to the poles of said magnet, a vibratory diaphragm and a link between said diaphragm and armature formed of German silver wire having an intermediate coil permitting relative angular movement of said armature while transmitting the vibrations of the diaphragm thereto.

6. In an apparatus for amplifying the sound of heart action, a microphonic transmitter including a magnet and an oscillatory armature in operative relation to the poles of said magnet, a vibratory diaphragm spaced from said armature, and a link connection between said diaphragm and armature adapted to produce a dampening effect on the vibrations transmitted therethrough.

7. In an apparatus for amplifying the sound of heart action, a microphonic transmitter including a magnet and an oscillatory armature in operative relation to the poles of said magnet, a vibratory diaphragm formed of non-magnetic metal and spaced from said armature, and a link connecting said diaphragm and armature adapted to produce a dampening effect on the vibrations transmitted therethrough.

8. In an apparatus for amplifying the sound of heart action, a casing, a microphonic transmitter enclosed thereby, a knob, a mounting on said casing for said knob permitting of pressing the same firmly against the body of the patient to receive the heart sound vibrations therefrom, and means intermediate said knob and microphonic transmitter for dampening out disturbing sound vibrations.

9. In an apparatus for amplifying the sound of heart action, a casing, a microphonic transmitter enclosed thereby, a knob, a diaphragm secured to said casing forming a mounting for said knob permitting of pressing the same firmly against the body of the patient to receive the heart sound vibrations therefrom, and means intermediate said knob and microphonic transmitter for dampening out sound vibrations of smaller amplitudes and of higher frequencies.

RAYMOND W. BONNER.
HARRY M. KIRSCHBAUM.